United States Patent [19]

Smith

[11] 4,179,219

[45] Dec. 18, 1979

[54] REVOLVING MIRROR SCANNING INTERFEROMETER

[76] Inventor: Stanley T. Smith, 612 Weiman, Ridgecrest, Calif. 93555

[21] Appl. No.: 894,675

[22] Filed: Apr. 10, 1978

[51] Int. Cl.$^2$ ............................ G01B 9/02; G01J 3/00
[52] U.S. Cl. ..................................... 356/346; 350/293
[58] Field of Search ...................... 356/345, 346, 349

[56] References Cited

U.S. PATENT DOCUMENTS

| 3,632,871 | 1/1972 | Watkins | 178/7.6 |
| 3,684,379 | 8/1972 | Girard | 356/346 |
| 3,776,637 | 12/1973 | Hecht | 356/345 |
| 4,088,898 | 5/1978 | Stitch | 356/350 |

Primary Examiner—John K. Corbin
Assistant Examiner—Scott J. Sugarman
Attorney, Agent, or Firm—R. S. Sciascia; W. Thom Skeer; K. G. Pritchard

[57] ABSTRACT

A spectral scan by using a rotating spiralling toroidal mirror. The scan is made of a light beam from a source. A beamsplitter divides the beam into two components. One component is reflected off of a fixed mirror back to the beamsplitter. The second component is reflected off of the spiralling toroidal mirror back to the beamsplitter. As the mirror rotates, the pathlength constantly changes producing an interference pattern for all wavelengths within the range of the instrument.

8 Claims, 6 Drawing Figures

REVOLVING MIRROR SCANNING INTERFEROMETER

BACKGROUND OF THE INVENTION

1. Field of the Invention

This invention relates to spectral scanning interferometers and more particularly to interferometers made with spiralling toroidal mirrors.

2. Description of the Prior Art

Previous interferometers have been made using a reciprocating mirror to obtain repetitive interferograms. Interferograms, representing an arrangement of various wavelengths of radiation incidented upon the beamsplitter, may be transformed into spectra. Computers have been used to make this transformation and plot radiant intensities versus frequency or wavelengths.

DESCRIPTION OF THE PREFERRED EMBODIMENT

Throughout the following description, like numbers refer to like elements.

Figure 1:
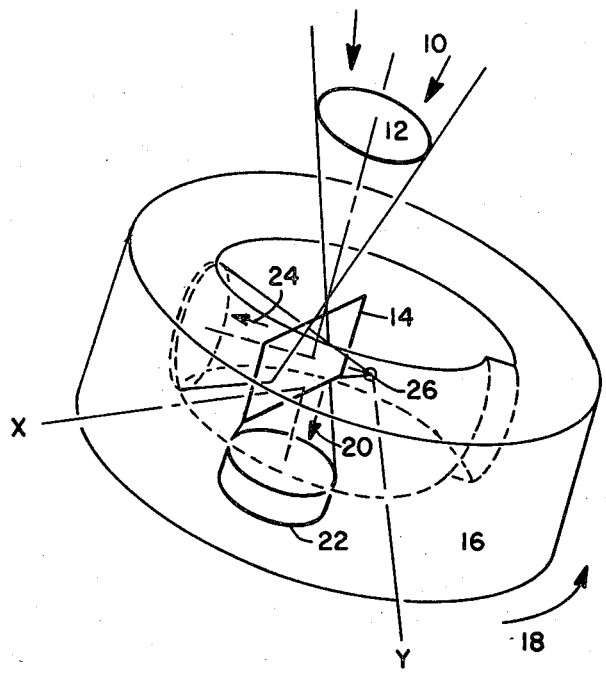
FIG. 1 is the basic concept of the present invention.

FIG. 1 shows the basic schematic of a revolving mirror interferometer. Incoming radiation 10 is focused by a lens 12 to a point before a beamsplitter 14. Beamsplitter 14 is located within optical beam 10 and a spiralling toroidal mirror 16 which rotates in the direction shown by arrow 18. The distance between beamsplitter 14 and the focused point of radiation 10 depends on how much area of beamsplitter 14 is to be illuminated. Radiation 10 is divided into two components by beamsplitter 14. The component shown by arrow 20 is transmitted through beamsplitter 14 to a fixed mirror 22. Component 20 is reflected back to beamsplitter 14 from fixed mirror 22. The component shown by arrow 24 is reflected off of beamsplitter 14 to the interior surface of spiralling toroidal mirror 16. Component 24 is also reflected back to beamsplitter 14. The recombination of components 20 and 24 will produce a fringe pattern for various wavelengths corresponding to the path difference travelled by components 20 and 24. This fringe pattern is recorded by detector 26.

FIG. 1 shows spiralling toroidal mirror 16 mounted so it rotates in an X-Y plane. The X-Y plane is the plane of symmetry of spiralling toroidal mirror 16. In this plane, the radius R($\theta$) of the spiral gradually increases as the angle of rotation, $\theta$, increases. Planes perpendicular to the X-Y plane and perpendicular to the center of the spiral intersect the spiralling toroidal mirror surface. Each intersection is an arc of circle radius R($\theta$). The mirror surface is spiral shaped in the X-Y plane and spherical shaped in the perpendicular plane.

Rays of component 24 that are in the perpendicular plane are reflected from a spherical arc and have identical optical path lengths. By making the spiral gradual, rays of component 24 in the X-Y plane will have small variations in optical path length. This geometric design results in a large number of rays used in the fringe image. In a Michelson interferometer, only the principle ray is perpendicular to the mirror surface and remains perpendicular as the mirror moves. This difference provides a high throughput advantage for the current invention. Throughput is defined as the amount of flux per unit sterance when all rays in a beam have equal steronoid.

As spiralling toroidal mirror 16 rotates, the path length travelled by component 24 changes. Thus, the rotation of spiralling toroidal mirror 16 produces components of the interferogram for each wavelength as a function of the rotational angle, $\theta$. The spectral components of radiation 10 are obtained from the interferogram. This provides a complete spectral scan within the range of the optical components of the interferometer.

Figure 2:
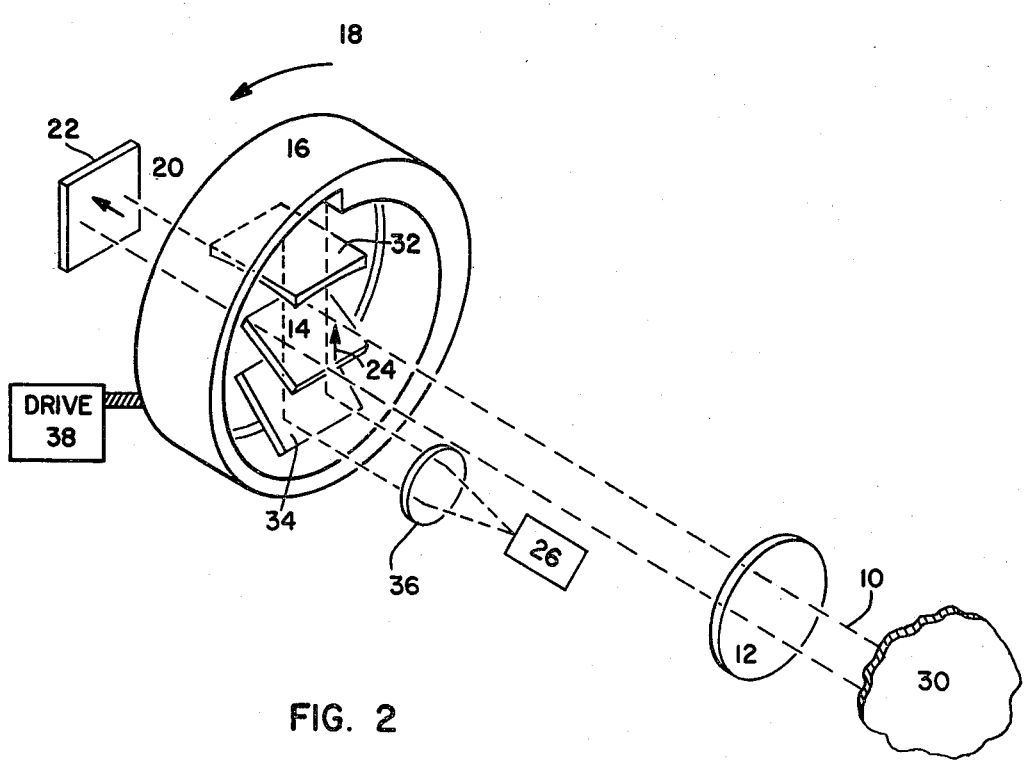
FIG. 2 is the preferred embodiment of the present invention.

FIG. 2 shows a schematic of the preferred embodiment. Source 30 emits radiation 10. Radiation 10 is collected by lens 12 and focused to a point before beamsplitter 14 which is located within the radiation beam. Converging rays are desirable and a lens 32 may be added to improved the performance, by decreasing the variation of the optical path differences within the field of view. Lens 32 is not normally present in the preferred embodiment. Spriralling toroidal mirror 16 is rotated by a drive means 38. Drive means 38 can be any of several well known devices. Examples include belt drive, gear drive and friction wheel among others. Detector 26 views the fringe patterns reflected from output mirror 34 after they are focused by lens 36. Detector 26 can be either a photographic or electronic detection system. At the user's option, detector 26 can include means for comparing observed spectral with known patterns.

FIGS. 3, 4, 5 and 6 show alternative embodiments of the present invention.

Figure 3:
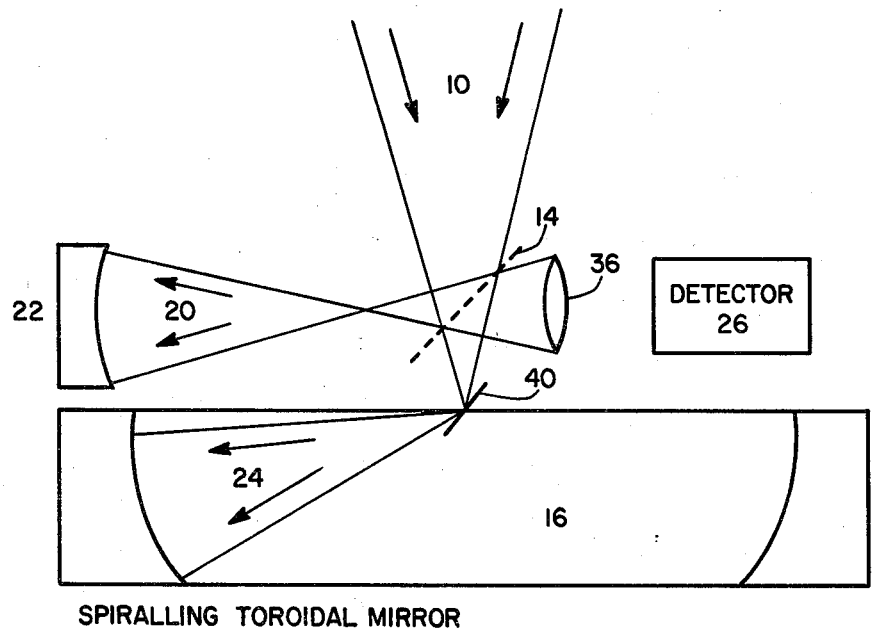
FIGS. 3, 4, 5 and 6 are alternative construction designs of the present invention.

FIG. 3 shows use of a folding mirror 40. Folding mirror 40 permits other elements to be located outside of the cavity of the spiralling toroidal mirror 16.

Figure 4:
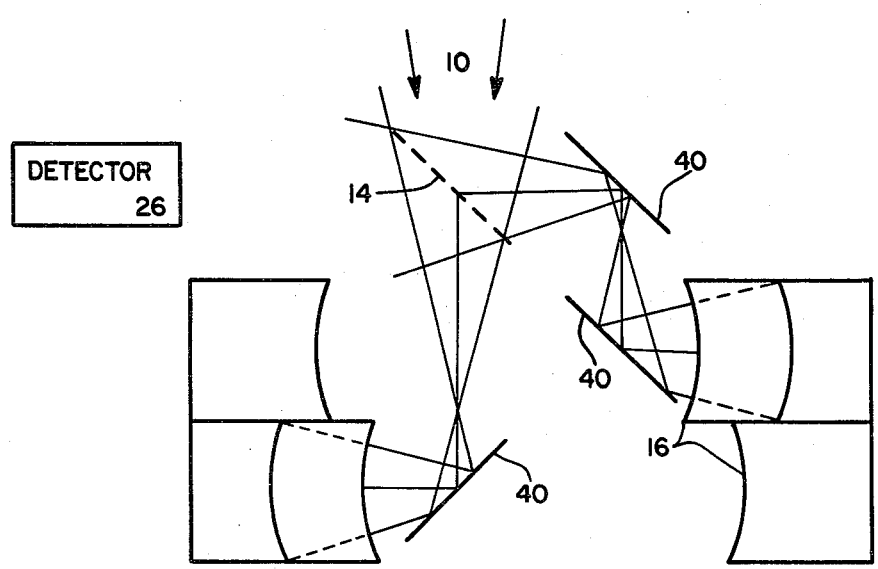

FIG. 4 uses two spiralling toridal mirrors 16 rotating counter to one another. This arrangement permits increased spectral range, since both components have varying pathlengths from the beamsplitter.

Figure 5:
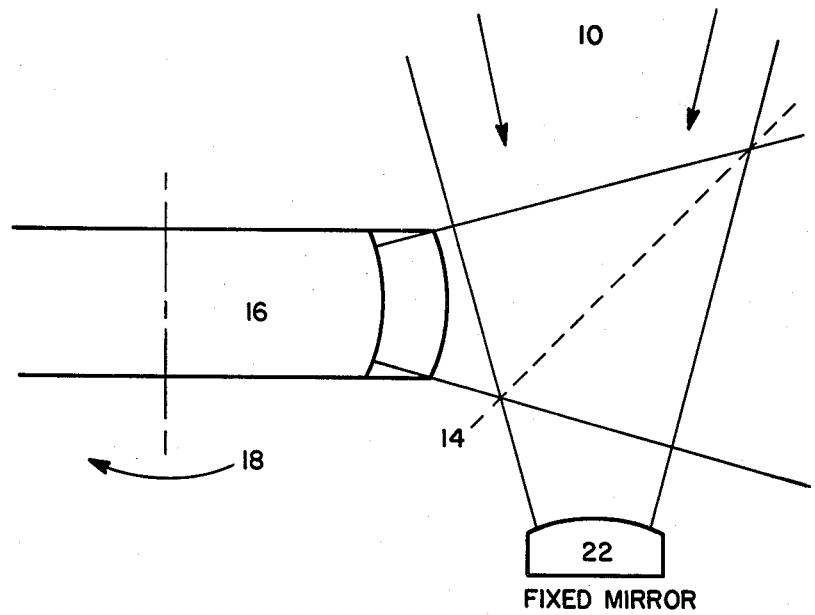

FIG. 5 uses a convex spiralling toroidal mirror 16. The convex reflecting surface is the exterior surface. This arrangement permits several units to be placed around the convex mirror.

Figure 6:
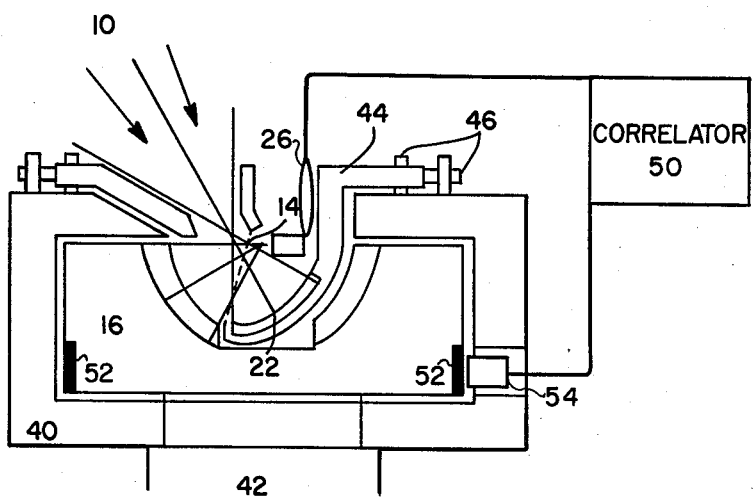

FIG. 6 has a canted spiralling toroidal mirror 16. The principle ray of the incoming radiation 10 is at an angle of 45° with the rotational axis of the mirror. This permits the space in front of the mirror to be completely open, providing easy access for cutting tools. An optical frame 40 is supported by an air bearing 42. They support an optical cylinder 44 which is adjusted by aligning and clamping screws 46.

FIG. 6 also shows means for comparing known spectra with observed spectra Detector 26 sends a signal of the information it is receiving to a correlator 50. Correlator 50 compares this information to known spectral information recorded on magnetic coating 52 which is on the base of spiralling toridal mirror 16. Magnetic coating 52 can be either a magnetic drum, magnetic tape or any similar device. Read and write heads 54 are used to record the spectra desired and to read the spectra back to correlator 50 which can make the comparison with observed spectra from detector 26.

It is obvious that other modifications and variations can be made on what has been disclosed.

What is claimed is:

1. A spectral scanning interferometer of a light beam from a source comprising:

a beamsplitter in the path of said light beam for dividing said light beam into two components, a reflected component and a transmitted component, a fixed mirror positioned in the path of said transmitted component so that said transmitted component is reflected back to said beamsplitter;

an aspheric cylindrical drum mirror positioned around said beamsplitter such that whereever said reflected component impinges on said drum mirror said reflected component is reflected back to said beamsplitter;

means attached to said drum mirror for rotating said drum mirror, whereby said component reflected from said beamsplitter to said drum mirror and back travels a different path length for every possible orientation of said drum mirror as it rotates;

an output mirror positioned in the path of the light from said beamsplitter caused by the recombining of said two components at said beamsplitter for reflecting the image of said recombined components away from said drum mirror; and means for detecting said reflected image optically positioned in line with said output mirror.

2. A spectral scanning interferometer as described in claim 1 further comprising means for focusing said reflected image from said output mirror positioned between said output mirror and said detecting means.

3. A spectral scanning interferometer as described in claim 1 further comprising a lens between said source and said beamsplitter for focusing said light beam.

4. A spectral scanning interferometer as described in claim 1 further comprising a lens placed between said drum mirror and said beamsplitter for focusing converging rays in said component traversing between said drum mirror and said beamsplitter.

5. A spectral scanning interferometer of a light beam from a source comprising, a beamsplitter in the path of said light beam for dividing said light beam into two components, a reflected component and a transmitted component, a fixed mirror positioned in the path of said reflected component so that said reflected component is reflected back to said beamsplitter;

a relay mirror optically positioned behind said beamsplitter for folding said transmitted component into a different direction;

a spiralling toroidal mirror optically positioned in the path of said folded transmitted component such that said transmitted component is reflected back to said beamsplitter via said folding relay mirror;

means attached to said spiralling toroidal mirror for rotating said spiralling toroidal mirror, whereby said component reflecting off said spiralling toroidal mirror traverses a different pathlength for every orientation of said spiralling toroidal mirror; and means for dectecting the pattern of light formed by said components when they recombine at said beamsplitter.

6. A spectral scanning interferometer of a light beam from a source comprising:

a beamsplitter in the path of said light beam for dividing said light beam into two components, a reflected component and a transmitted component;

a plurality of relay mirrors placed in the paths of said components such that said components are steered into predetermined directions;

a pair of spiralling toroidal mirrors placed such that one of said spiralling toroidal mirrors reflects one of said components back to said beamsplitter and said other spiralling toroidal mirror is set counter to its pair and reflects said second component back to said beamsplitter;

means attached to each spirally toroidal mirror for rotating said spirally toroidal mirrors in opposite directions, whereby said components reflect off said spiralling toroidal mirrors such that each traverses a different pathlength for every orientation of the spiralling toroidal mirror it reflects off of; and means for detecting the pattern of light formed by said components when they recombine at said beamsplitter.

7. A spectral scanning interferometer of a light beam from a source comprising:

a beamsplitter in the path of said light beam for dividing said light beam into two components, a reflected component and a transmitted component;

a fixed mirror positioned in the path of said transmitted component so that said transmitted component is reflected back to said beamsplitter;

a spiralling toroidal mirror positioned in the path of said reflected component such that said transmitted component is reflected back to said beamsplitter, said spiralling toroidal mirror is canted such that said incoming light beam is at an angle of 45° with the rotational axis of said spiralling toroidal mirror;

means attached to said spiralling toroidal mirror for rotating said spiralling toroidal mirror, whereby said component reflecting off said spiralling toroidal mirror traverses a different pathlength for every orientation of said spiralling toroidal mirror; and means for detecting the pattern of light formed by said components when they recombine at said beamsplitter.

8. A spectral scanning interferometer as described in either claim 1, claim 5, claim 6 or claim 7 where said detecting means further comprises means for comparing known spectra to observed spectra.

* * * * *